Patented Mar. 22, 1932

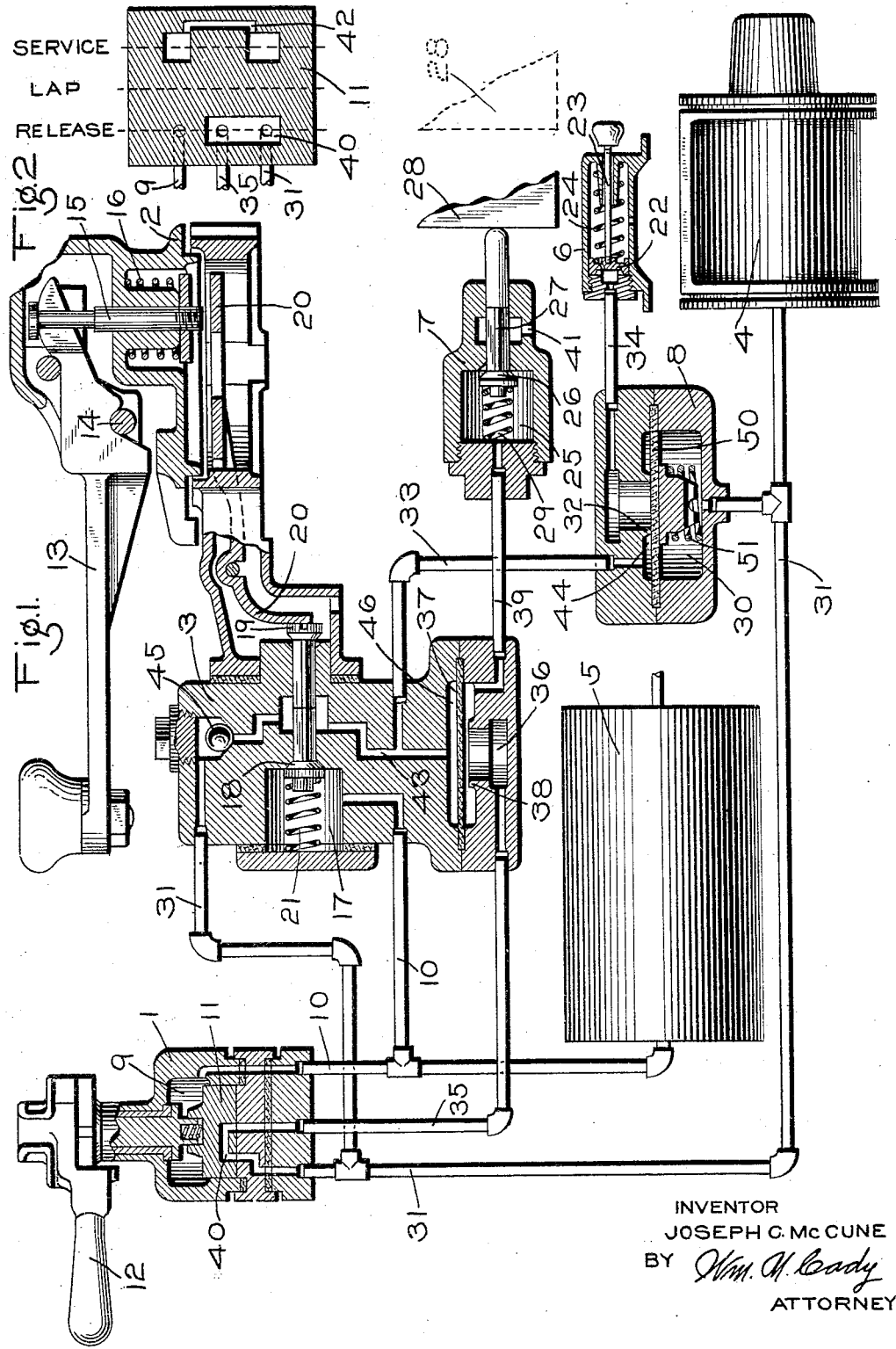

1,850,596

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

SAFETY CAR EQUIPMENT

Application filed July 10, 1930. Serial No. 467,000.

This invention relates to a safety car control equipment in which the brakes are automatically applied when the operator becomes incapacitated.

One object of my invention is to provide an improved safety car control equipment of few parts, and which may be applied in connection with a simple straight air brake equipment.

Another object of my invention is to provide a safety car control equipment in which the brakes cannot be released so long as the car doors remain open.

Other objects and advantages will appear in the following more detailed description of the invention.

In the accompanying drawings; Fig. 1 is a diagrammatic view, partly in section, of a safety car control equipment embodying my invention; and Fig. 2 a diagrammatic view, showing the operating positions of the brake valve device.

As shown in the drawings, the equipment may comprise a brake valve device 1, a safety controller handle unit 2, a pilot valve device 3, a brake cylinder 4, a main reservoir 5, a circuit breaker cylinder 6, a door controlled valve device 7, and a valve device 8.

The brake valve device 1 comprises the usual casing having a valve chamber 9, connected through pipe 10 with the main reservoir 5 and containing a rotary valve 11 adapted to be operated by a handle 12.

The safety controller handle unit 2 comprises a controller handle 13, which is adapted upon rotation to control the electric power for propelling the car in the usual manner, and which is mounted to rock on a pivot pin 14. The handle 13 is operatively connected to a plunger 15, which is urged downwardly by a spring 16, so that the handle 13 must be held depressed to hold the plunger in its upper position, as shown in the drawings.

The pilot valve device 3 comprises a casing having a valve chamber 17 containing a pilot valve 18 having a stem which engages the stem of a valve 19. The valve 19 is engaged by one end of a lever 20, the other end of which is adapted to be engaged by the plunger 15. A spring 21 urges the valve 18 to its seat, so that with handle 13 held depressed and the plunger 15 maintained out of engagement with lever 20, the pilot valve 18 will remain seated.

The circuit breaker cylinder 6 contains a piston 22 which is provided with a piston rod 23 adapted when projected to operate a circuit breaker (not shown), so as to cut off the electric power for propelling the car. A spring 24 urges the piston 21 to its inner position as shown in the drawings.

The door controlled valve device 7 comprises a casing having a valve chamber 25 containing a poppet valve 26 having a stem 27 which extends out of the casing and is adapted to be engaged by a car door 28, when the car door is in its closed position, so as to unseat the valve 26. A spring 29 urges the valve 26 to its seat when the car door 28 is moved to its open position, as shown in dotted lines.

The valve device 8 comprises a casing containing a flexible diaphragm 50 having the chamber 30 at one side connected to pipe 31 which leads to the brake cylinder 4 and adapted when urged upwardly to engage a seat rib 32, so as to cut off communication from a pipe 33, to a pipe 34 leading to the piston 22 of the circuit breaker cylinder.

The exhaust port of the brake valve device 1 is connected to a pipe 35, which leads to a chamber 36 in the casing 3. A flexible diaphragm 37 is mounted in casing 3 and is adapted to engage an annular seat rib 38 for cutting off communication from pipe 35 to a pipe 39, leading to valve chamber 25.

In the release position of the brake valve handle 12, a cavity 40 in the rotary valve 11 connects straight air pipe 31 with pipe 35 and if the car door 28 is in its closed position, the valve 26 will be held unseated, so that the straight air pipe is connected to the atmospheric exhaust port 41.

A straight air application of the brakes is effected by moving the handle 12 to service position, in which the valve chamber 9 is connected through a port 42 in the rotary valve 11 with pipe 31. Fluid under pressure is thus supplied through the straight air pipe 31 to the brake cylinder 4 to effect a service application of the brakes.

If the operator releases the controller handle 13, the plunger 15 will be forced downwardly by spring 16 so as to operate the lever 20 and thereby cause the valve 19 to seat and the pilot valve 18 to be unseated. When valve 18 is unseated, fluid under pressure is supplied from the main reservoir 5, which is connected to valve chamber 17, to passage 43, and thence through pipe 33 to diaphragm chamber 44. If the brake cylinder pressure in chamber 30 has not been increased to a sufficient degree, the diaphragm 50 will be moved from the seat rib 32, permitting the supply of fluid under pressure from pipe 33 to pipe 34, so that piston 22 is operated to project the rod 23 and thus effect the opening of the power circuit of the car.

Fluid under pressure is also supplied from valve chamber 17 to pipe 31 past the check valve 45, so that fluid is supplied to the brake cylinder 4 to effect an emergency application of the brakes.

When an application of the brakes is effected by the release of the controller handle, fluid under pressure supplied through passage 43 to diaphragm chamber 46 deflects the diaphragm 37 so as to cause it to seat on the seat rib 38. Communication from pipe 35 to pipe 39 is thus cut off, so that release of fluid from the brake cylinder through the brake valve release port is prevented when the brakes are applied by the release of the controller handle 13.

When the car door 28 is moved to open position, the valve 26 is seated by spring 29, so that if after the brakes have been applied by operating the brake valve device 1, the brake valve handle 12 be turned to release position, the brakes will not be released, since communication from the straight air pipe 31 to the atmosphere is cut off by the seating of valve 26. When the car door is moved to its closed position, the valve 26 is again unseated, so as to permit the fluid under pressure to be released from the brake cylinder.

If a straight air application of the brakes is effected, and the brake cylinder pressure is at a predetermined degree, then the circuit breaker piston 22 will not be operated to open the power circuit when the controller handle is released, since the brake cylinder pressure in chamber 30, plus the pressure of spring 51 will hold the diaphragm 50 seated on the seat rib 32 against the pressure of fluid supplied through pipe 33 to diaphragm chamber 44, so that fluid under pressure is prevented from flowing to pipe 34 and circuit breaker piston 22.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder and a brake valve device for controlling the supply of fluid under pressure to and its release from the brake cylinder, of a car door and a valve operable by the car door for controlling communication through which fluid is released from the brake cylinder.

2. In a fluid pressure brake, the combination with a brake cylinder and a brake valve device for controlling the supply of fluid under pressure to and its release from the brake cylinder of a car door and a valve operated by said car door when in closed position for opening communication through which fluid is released from the brake cylinder, said valve being operated to close said communication upon opening the car door.

3. In a fluid pressure brake, the combination with a brake cylinder and a brake valve device for controlling the supply of fluid under pressure to and its release from the brake cylinder, of a car door, a controller handle, means operated upon release of the handle for supplying fluid under pressure to the brake cylinder, a flexible diaphragm operated by fluid supplied to the brake cylinder upon release of the controller handle for cutting off communication through which fluid is released from the brake cylinder, and a valve operated upon opening said car door for also cutting off communication through which fluid is released from the brake cylinder.

In testimony whereof I have hereunto set my hand, this 8th day of July, 1930.

JOSEPH C. McCUNE.